United States Patent [19]
Garrett

[11] Patent Number: 5,594,873
[45] Date of Patent: Jan. 14, 1997

[54] SYSTEM AND METHOD FOR IDENTIFYING EXPANSION DEVICES IN A COMPUTER SYSTEM

[75] Inventor: James E. Garrett, Round Rock, Tex.

[73] Assignee: Dell USA, L.P., Austin, Tex.

[21] Appl. No.: 353,047

[22] Filed: Dec. 8, 1994

[51] Int. Cl.$^6$ .................................................. H01J 13/00
[52] U.S. Cl. ................. 395/281; 395/282; 395/283; 395/733; 395/822; 395/828; 395/835
[58] Field of Search ....................... 395/281, 280, 395/283, 297, 821, 822, 823, 828, 829, 830, 831, 882

[56] References Cited

U.S. PATENT DOCUMENTS

| | | | |
|---|---|---|---|
| 4,775,931 | 10/1988 | Dickie et al. | 395/280 |
| 5,140,133 | 8/1992 | O'Brien et al. | 219/229 |
| 5,297,275 | 3/1994 | Thayer | 395/550 |
| 5,319,785 | 6/1994 | Thaller | 395/725 |
| 5,359,715 | 10/1994 | Heil et al. | 395/280 |
| 5,454,081 | 9/1995 | Thome | 395/281 |
| 5,465,333 | 11/1995 | Olnowich | 395/281 |
| 5,491,830 | 2/1996 | Ferri | 395/829 |

*Primary Examiner*—Jack B. Harvey
*Assistant Examiner*—Raymond N. Phan
*Attorney, Agent, or Firm*—Henry N. Garrana; Mark P. Kahler; Michelle M. Turner

[57] ABSTRACT

A method and apparatus for identifying option modules or expansion devices coupled to an expansion bus using time domain methods. According to the present invention, each expansion device includes logic circuitry that asserts an identification signal a preset time duration after a host reset signal is pulsed. A unique preset time duration or time constant is designated for each expansion device, and the host computer identifies each expansion device by the length or duration of the identification signal. In the preferred embodiment, during the power-on sequence the computer system asserts a reset signal pulse to the identification logic in each respective expansion device which directs the expansion device to assert its identifying signal. The host computer determines the length of time between assertion of the reset signal pulse and assertion of the identification signal and uses this information to determine the type of expansion device.

20 Claims, 5 Drawing Sheets

EXPANSION DEVICE
IDENTIFICATION LOGIC

HOST COMPUTER (polling)

HOST COMPUTER (interupt driven)

5,594,873

SYSTEM AND METHOD FOR IDENTIFYING EXPANSION DEVICES IN A COMPUTER SYSTEM

FIELD OF THE INVENTION

The present invention pertains to expansion devices in computer systems, and more particularly to the identification of expansion devices by a host computer using time domain techniques.

DESCRIPTION OF THE RELATED ART

Modern computer systems include a plurality of different buses for interconnection of the various components. For example, computer systems generally include a memory or host bus for coupling the CPU to main memory. Computer systems are also equipped with one or more expansion buses which allow a user to add various optional devices, such as additional memory, sound cards, modems, network interface cards, graphics cards, etc.

Several different expansion bus designs have been developed. The original PC included an expansion bus standard referred to as the XT bus. The AT bus, also referred to as the Industry Standard Architecture (ISA) bus, improved on the PC XT bus by adding more data and address lines, new interrupt lines, and DMA control lines. The AT bus also allowed the microprocessor and expansion bus to be separately clocked. An extension to the ISA bus was later developed, referred to as the Extended Industry Standard Architecture (EISA) bus, which created a 32 bit industry standard. Another 32 bit expansion bus is the Microchannel Architecture (MCA) bus developed by IBM. In addition to the above expansion buses, several new local expansion buses have been developed, including the Peripheral Component Interconnect (PCI) bus from Intel Corp. and the Video Electronics Standards Association (VESA) VL bus. Also, as mentioned above, many computer manufacturers include one or more proprietary buses, such as a proprietary memory or host bus.

Currently, many expansion devices are configured as adapter cards that are removably inserted into slots on the motherboard which connect to the expansion bus. Thus different types of adapter cards can be placed in the various expansion slots. Alternatively, instead of configuring the expansion device as a removable adapter card, the expansion device can be mounted directly to the motherboard. This is common in smaller systems such as laptops where space and weight constraints make the conventional removable adapter card unfeasible.

One consideration of expansion bus design is how to identify the devices that are connected to the host computer via the expansion bus. A current method for detecting and recognizing expansion cards is to designate a certain number of connector pins on the card to provide a code unique to the respective device. When the host computer boots up, the host CPU queries each expansion device independently for the identifying code and then reads a file containing a description of each expansion device corresponding to the identifying code.

This method of identification has several drawbacks. First, because each expansion device must have a unique code, this method is limited by the number of pins that can be designated for identifying the device. In addition, the connector pins used for the unique code consume valuable space on the connector that can be used for other purposes. Therefore, a method and apparatus is desired which easily allows the host to identify expansion or I/O devices while reducing the total number of interconnect requirements. A method of identification is also desired which can accommodate a larger number of option modules than possible using connector pins to produce a unique code as discussed above. Further, a method and apparatus is desired which reduces the space and interconnect requirements necessary to identify expansion devices. Also, a method of identification is also desired which provides recognition of dynamically installable (hot pluggable) devices.

SUMMARY OF THE INVENTION

The present invention comprises a method and apparatus for identifying option modules or expansion devices using time domain methods. According to the present invention, each expansion device includes logic circuitry that deasserts an identification signal for a preset time duration after a host reset signal is pulsed, i.e., the logic asserts the identification signal a preset time duration after the host reset signal is pulsed. A unique preset time duration or time constant is designated for each expansion device, and the host computer identifies each expansion device by the length or duration that the identification signal is negated.

In the preferred embodiment, during the power-on sequence the computer system asserts a reset signal pulse that is received by identification logic in each respective expansion device. Each expansion device deasserts its identification signal for a unique preset period of time, depending on the type of expansion device. The host computer determines the length of time between the reset signal pulse and assertion of the identification signal and uses this information to determine the type of expansion device.

In one embodiment, the identification logic in the expansion device comprises a capacitor forming an RC time constant with a pull-up resistor connected to the expansion slot in the host computer. The value of the capacitor is varied for different expansion devices, producing a unique identifying time constant that allows for identification of a large number of expansion devices. The identification logic in the expansion device receives the reset signal from the host computer system. The reset signal pulse causes the capacitor to discharge, which initializes the identification signal, referred to as $T_{in}$, to zero. After the reset signal is pulsed, the capacitor charges at a rate of $1/RC$. When the capacitor exceeds the threshold voltage of a gate, the gate is triggered and asserts the identification signal $T_{in}$ to the host computer system. In the preferred embodiment, a one-shot timer is used to provide a time delay before assertion of the $T_{in}$ signal. The one-shot timer includes inputs coupled to various capacitors whose values can be varied to produce different time durations of delay.

The time duration between the reset signal being pulsed and the assertion of the $T_{in}$ signal, i.e., the time that the $T_{in}$ signal is held low, is used to identify the expansion device. The host computer preferably includes a timer for each expansion device that determines the length of time between the reset signal pulse and the assertion of the $T_{in}$, signal. This time value is used by the host computer system to determine the type of expansion card. The computer system preferably uses either a polling method or an interrupt method to detect assertion of the $T_{in}$ signal. When the computer system detects the assertion of the $T_{in}$, signal, the computer system reads the value in the respective timer to identify the respective expansion device.

In an alternative embodiment, a microprocessor, or other digital circuitry, which is located on the expansion card, could be used to generate the $T_{in}$ signal to the host computer system. In such embodiment, the host computer would generate a reset signal pulse which would be received by the microprocessor or other circuitry, and the microprocessor or circuitry would generate a $T_{in}$ signal having delay characteristics relating to the expansion device.

Therefore, the present invention comprises an improved method and apparatus for identifying expansion devices connected to an expansion bus of a computer system. The present invention requires reduced interconnect requirements while accommodating a greater number of expansion devices.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
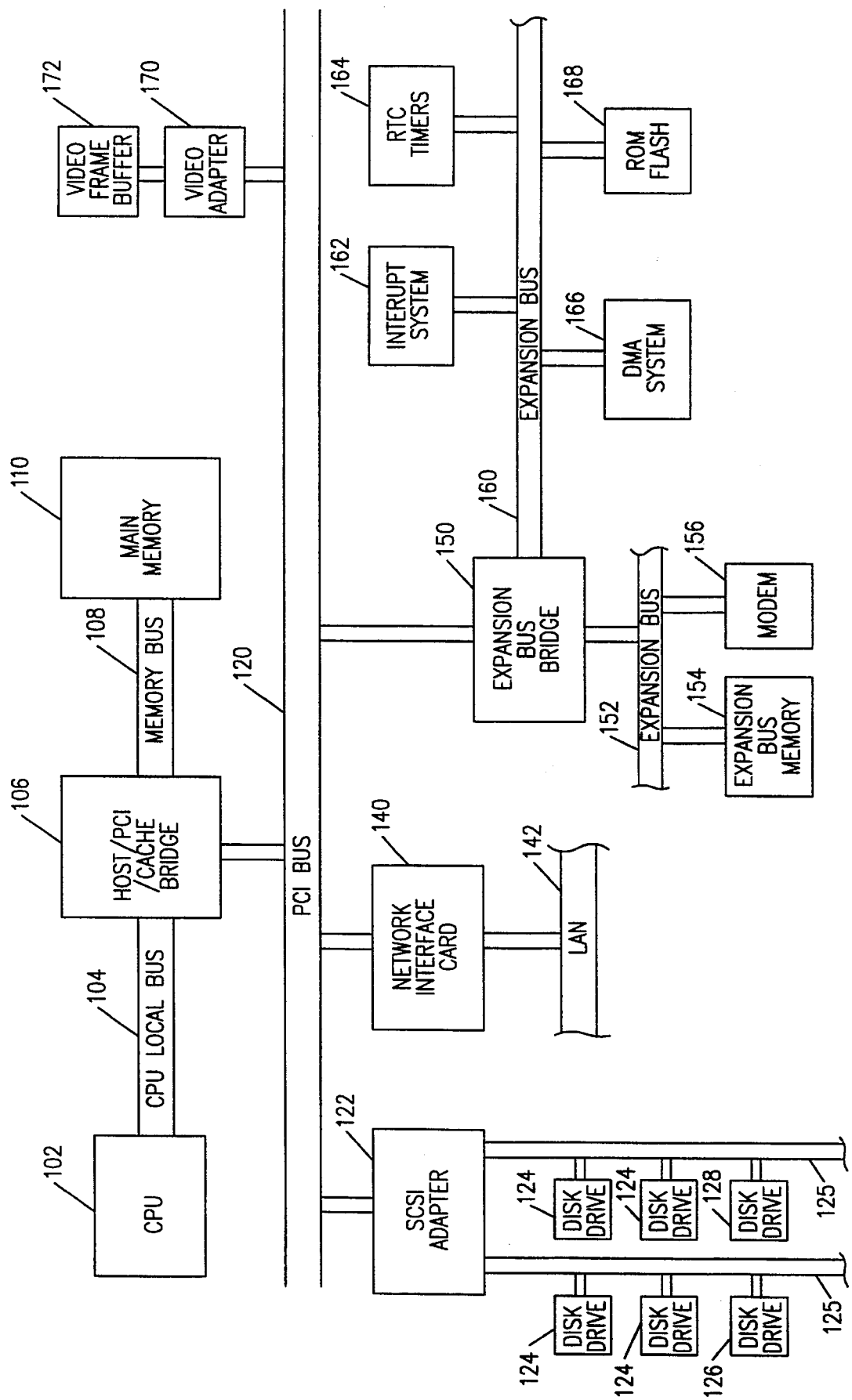
FIG. 1 illustrates a computer system incorporating one or more expansion devices, and including identification logic according to the present invention.

Referring now to FIG. 1, a block diagram of a computer system incorporating the preferred embodiment of the present invention is shown. It is noted that the present invention may be incorporated into any of various types of computer systems. Further, various types of expansion devices can be included in the computer system, as desired. As shown, the computer system includes a central processing unit (CPU) 102 which is coupled through a CPU local bus 104 to a host/PCI/cache bridge 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus or a proprietary bus.

Various types of devices may be connected to the PCI bus 120. In the embodiment shown in FIG. 1, a video adapter 170 and video frame buffer 172 are coupled to the PCI bus 120 for controlling video functions. A SCSI (small computer systems interface) adapter 122 is preferably coupled to the PCI bus 120. The SCSI adapter 122 includes two SCSI channels 123 and 125. Each of these SCSI channels 123 and 125 may have various devices connected to them. In the embodiment shown in FIG. 1, the SCSI channel 123 includes two disk drive units 124 and a tape drive 126. The SCSI channel 125 includes two disk drive units 124 and a CD-ROM 128. It is noted that other devices may be connected to the SCSI channels 123 and 125, as desired. Various other devices may be connected to the PCI bus 120, such as a network interface card 140. As shown, the network interface card 140 interfaces to a local area network (LAN) 142.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, the microchannel architecture (MCA) bus, or a proprietary bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM), etc.

One or more of the buses in the computer system use a method of identification according to the present invention. In addition, one or more of the expansion devices, such as SCSI adapter 122, network interface card 140, video adapter 170, modem 156, or expansion bus memory 154, include identification logic according to the present invention. Further, other types of expansion devices such as an optional cache memory or optional memory module (both not shown) may include identification logic according to the present invention. The host computer also includes identification logic used to identify the types of expansion devices. It is noted that the expansion devices may be configured as removable adapter cards that are inserted into slots on the respective expansion bus, or the expansion devices may be mounted directly to the motherboard of the computer system.

In a bus that supports the identification method of the present invention, each expansion device coupled to the bus includes identification logic circuitry that generates an identification signal for a preset time duration after a host reset signal is pulsed. In the preferred embodiment, the identification signal is negated for the preset time duration and is asserted when the preset time duration has expired. Other methods, such as asserting the identification signal for the preset period of time and then negating the signal, can be used as desired. A unique preset time duration or time constant is designated for each expansion device, and the host computer identifies each expansion device by the length or duration that the identification signal is negated. In the preferred embodiment, during the power-on sequence the computer system pulses a reset signal to each bus expansion slot. The identification logic in each respective expansion device coupled to the bus negates its identifying signal and then asserts its identifying signal a unique preset time after the reset signal is pulsed. The host computer determines the length of time between the reset signal pulse and assertion of the identification signal and uses this information to determine the type of expansion device.

Figure 2:
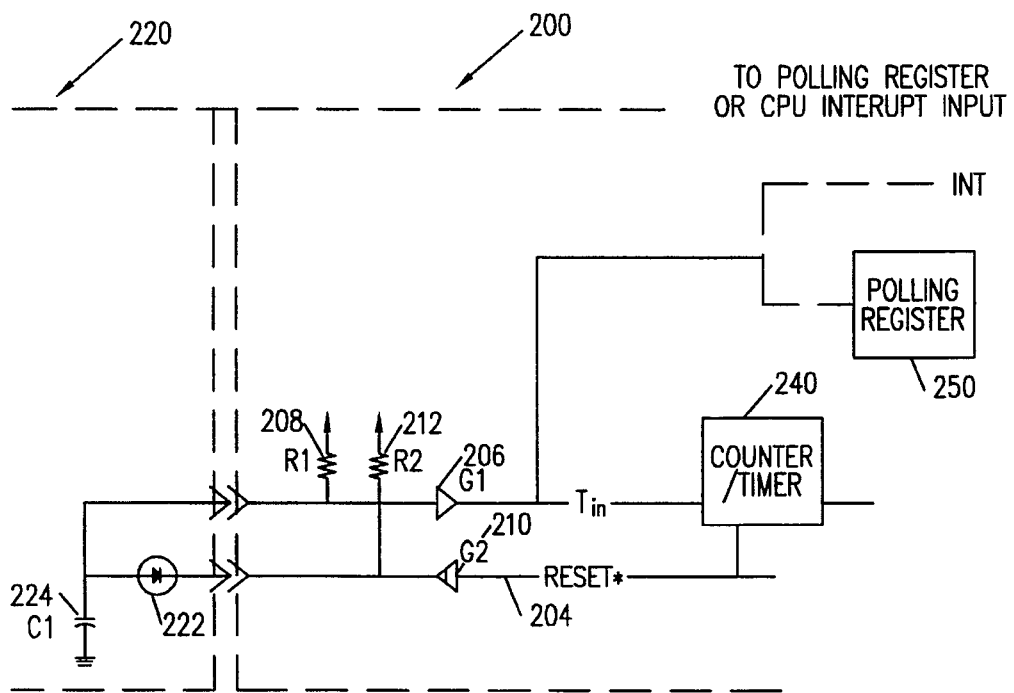
FIG. 2 is a schematic diagram illustrating identification logic in the expansion device and the host computer.

FIG. 2 illustrates the identification logic according to one embodiment of the invention. The identification logic comprises a host computer portion 200, referred to as the host connector identification logic 200, and an expansion device portion 220, referred to as the expansion device identification logic 220. The host connector circuit 200 includes a reset line 204 which is normally asserted high, but is pulsed low during a power-on reset. Reset line 204 is connected to the input of buffer or gate 210, which is an open collector gate. The output of gate 210 is connected to one side of a resistor 212, whose other end is connected to a logic high value. The output of gate 210 also connects to the expansion device identification circuit 220 in the expansion device when the expansion device is installed in the connector. As shown, the expansion device circuit 220 includes a diode 222 whose cathode connects to output of gate 210 when the expansion device is inserted or connected to the host connector. The anode of diode 222 is connected to a first end or plate of capacitor 224. The second end or plate of capacitor 224 is connected to ground. The first end of capacitor 224 also connects to one end of a resistor 208 and to an input of gate 206 in the host connector identification circuit 200 when the expansion device is inserted or connected as shown. The other end of resistor 208 is connected to a logic high. The output of gate 206 generates an identification signal referred to as $T_{in}$. The $T_{in}$ signal is provided to either a polling register 250 or to an interrupt input of the CPU 102, depending on the method of detection used, as discussed below. The $T_{in}$ signal also connects to an input of counter/timer 240 as does the reset signal. The timer 240 is readable by the CPU 102 and generates a value that corresponds to the time duration that the $T_{in}$ signal was negated.

At power-on the reset signal is pulsed low. This pulls the reset line 204 low, and the capacitor 224 discharges through the diode 222 until the capacitor 224 reaches almost zero volts. The low voltage on the capacitor forces the $T_{in}$ signal low as well. After the reset signal pulse, the reset line 204 is driven high and the capacitor 224 subsequently begins to charge at a 1/RC time constant, determined by the values of the resistor 208 and capacitor 224. When the voltage on capacitor 224 exceeds the threshold voltage of gate 206, gate 206 asserts the $T_{in}$ signal high. Timer 240 is used to accurately measure the time that the $T_{in}$ signal is held inactive or low. The timer 240 receives the reset signal and the $T_{in}$ signal as input. After the reset line 204 is pulsed and resumes its normally high state, the timer begins counting. When the capacitor 224 charges sufficiently and triggers gate 206, the $T_{in}$ signal is driven high, and the timer stops counting. Thus, the timer 240 measures the time that the $T_{in}$ signal is held low, and the host computer determines which expansion device is present based on the time that the $T_{in}$ signal was negated low, i.e., the time between the reset signal pulse and the assertion of the $T_{in}$ signal.

Different values for capacitor 224 and resistor 208 change the rate at which the capacitor charges and thus the time that the $T_{in}$ signal is negated low. In the embodiment of FIG. 2, only the capacitor 224 is included on the expansion device and thus only the value of the capacitor is varied for each device. In an alternate embodiment, both the resistor 208 and capacitor 224 are included on the expansion device, and both of these values are varied to produce different time constants for each expansion device. It is noted that, if a slot does not contain an expansion device, then the $T_{in}$ signal is asserted or goes active immediately when the reset signal is pulsed, and the counter 240 will thus hold a zero value. This indicates that the slot is empty.

The diode 222 is preferably an optional circuit element. The purpose of diode 222 is to isolate the capacitor 224 from gate 210 and resistor 212 when the capacitor 224 is charging. If diode 222 was not present, then the capacitor 224 would charge at a rate determined by resistor 208 and resistor 212 in parallel, instead of only by resistor 208.

Figure 3:
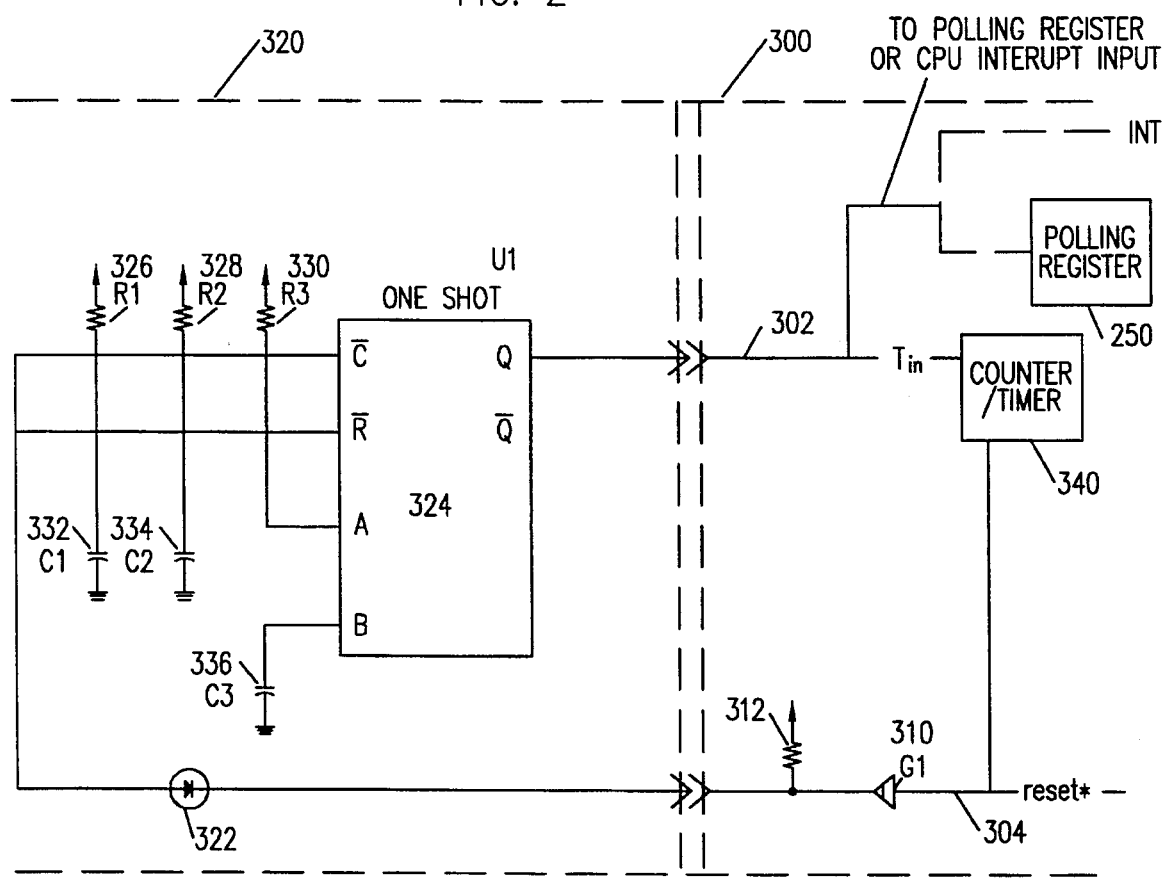
FIG. 3 is a schematic diagram illustrating identification logic in the expansion bus device and the host computer according to the preferred embodiment of the invention.

FIG. 3 illustrates the preferred embodiment for identifying an expansion device according to the present invention. The embodiment of FIG. 3 includes an expansion device portion 320 and a host portion 300. The expansion device portion 320 in FIG. 3 uses a one-shot timer to achieve greater timer accuracy. The host portion 300 includes a reset line 304 which is normally high, but is pulsed low during a power-on or reset. Reset line 304 is connected to the input of gate 310, which is an open collector gate. The output of gate 310 is connected to one end of a resistor 312 whose other end is connected to a logic high value. The output of gate 310 is also connected to cathode of diode 322 in the expansion device circuit 320. The anode of diode 322 is connected to one end of a resistor 328 and one end of a capacitor 334, and also to the clear input of the one-shot 324. The other end of the resistor 328 is connected to a logic high, and the other end of the capacitor 334 is connected to ground. The A input of the one-shot 324 is connected to one end of a resistor 330 whose other end is connected to a logic high value. The B input of the one-shot 324 is connected to one end of a capacitor 336 whose other end is connected to ground. The R input of the one-shot is connected to one end of a resistor 326 whose other end is connected to a logic high value. The R input of the one-shot is also connected to one end of capacitor 332 whose other end is connected to ground. The Q output of the one-shot 324 is the identification signal, referred to as $T_{in}$. The $T_{in}$ signal is provided to either a polling register 350 or to the interrupt input of the CPU 102, depending on the method of detection used, as discussed below. The $T_{in}$ signal is also provided to an input of counter/timer 340, as is the reset signal. The timer 340 provides an output to the CPU 102 when read.

At power-on, the reset signal is pulsed which pulls the reset line 304 low, and the capacitor 334 discharges through the diode 322. This clears the one-shot 324 and forces the $T_{in}$ signal low. When the reset signal is released, the reset line 304 is driven high and the capacitor 334 begins to charge at a 1/RC time constant, determined by the values of the resistor 328 and capacitor 334. Once the trigger voltage of the one-shot 324 is exceeded, the one-shot 324 drives the $T_{in}$ signal high. The time that the $T_{in}$ signal was held low is measured by timer 340, and the host computer determines the type of expansion device based on this time duration. Different values for capacitor 336 and resistor 330 change the time delay of the one-shot 324 and thus the time that the $T_{in}$ signal is held low or inactive.

The diode 322 is an optional circuit element. The purpose of diode 322 is to isolate the capacitor 334 from gate 310 and resistor 312 when the capacitor 334 is charging. If diode 322 was not present, then the capacitor 334 would charge at a rate determined by resistor 312 and resistor 328 in parallel, instead of just by resistor 328.

As with the circuitry in FIG. 2, the timer 340 is preferably included in the host computer system in order to accurately measure the time that the $T_{in}$ signal is held inactive. The timer 340 receives the reset signal and the $T_{in}$ signal, as shown. When the reset line 304 is released and resumes its normally high state, the timer begins counting. When the $T_{in}$ signal is driven high by the one-shot 324, the timer stops counting.

The identification logic in FIG. 3 is presently preferred because it consistently offers a high degree of accuracy. Both temperature and timer resolution generally affect the time that the $T_{in}$ signal is measured to be inactive. Because both capacitance and resistance vary with temperature, a circuit that is subject to extreme temperature variations will not produce a consistent $T_{in}$, making it difficult for the host computer to identify the expansion device. Likewise, if the timer has low resolution, then the number of expansion devices will be limited by the number of different $T_{in}$ signal durations that the timer is able to accurately measure. Because the one-shot allows for consistently high resolution time measurements with temperature fluctuations, the identification circuitry of FIG. 3 is capable of accurately supporting an extremely large number of expansion devices. The only limit to the number of expansion cards is the availability of different resistors and capacitors for controlling the one-shot's internal time delay and the resolution of the timer/counter.

Figure 4:
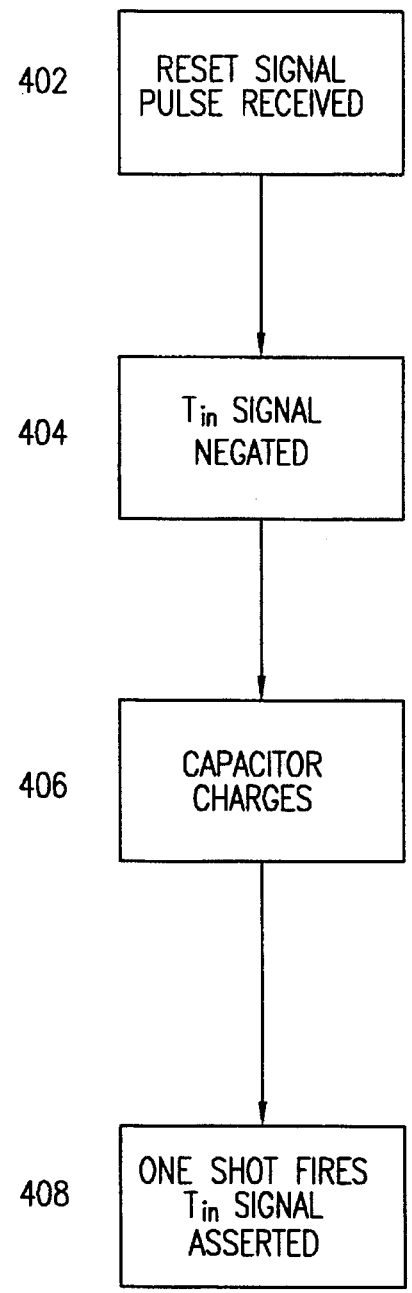
FIG. 4 is a flowchart diagram illustrating operation of the identification logic in the expansion device of FIG. 3.
Figure 5A:
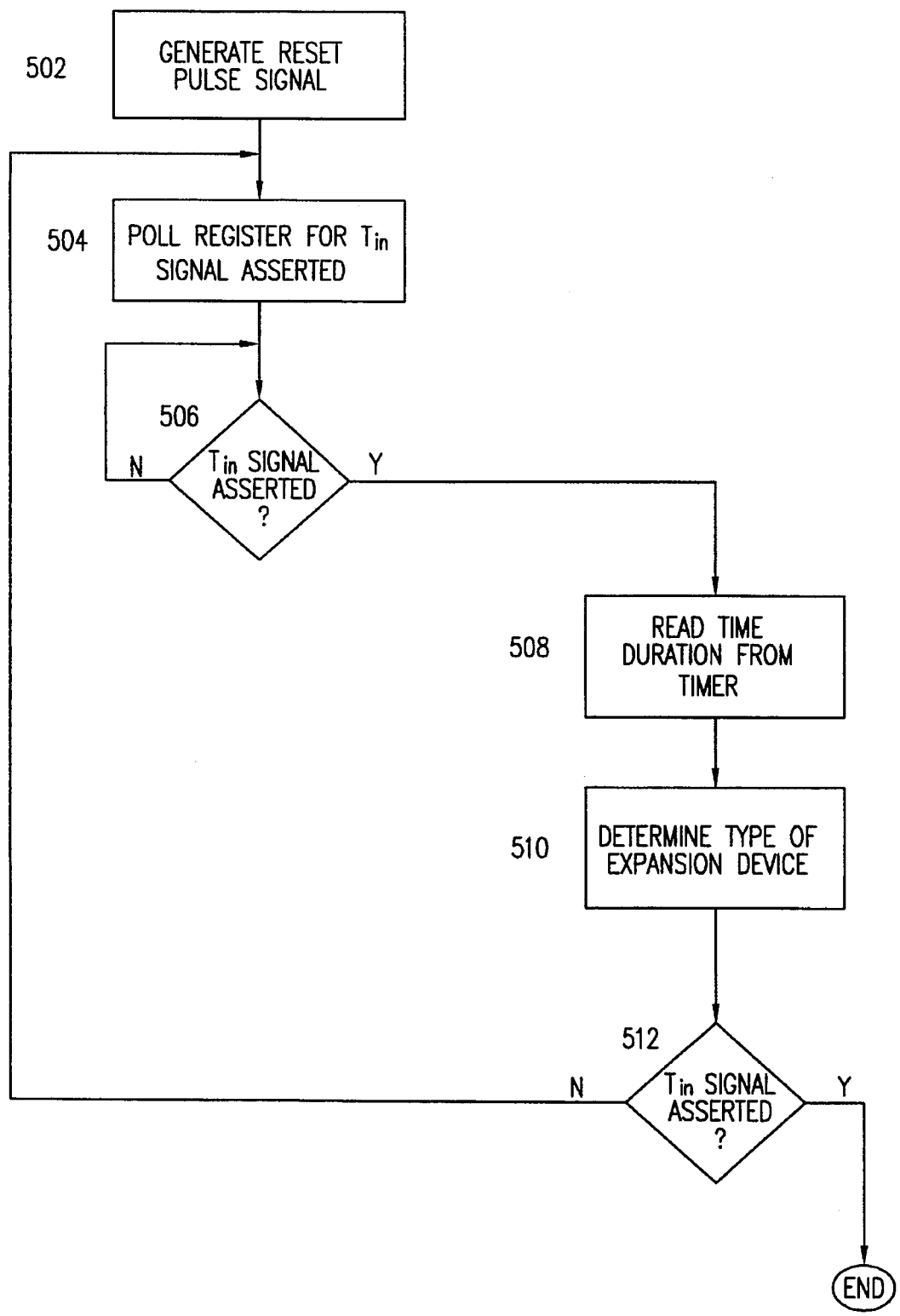
FIGS. 5A and 5B are flowchart diagrams illustrating methods used by the host computer to identify expansion devices.
Figure 5B:
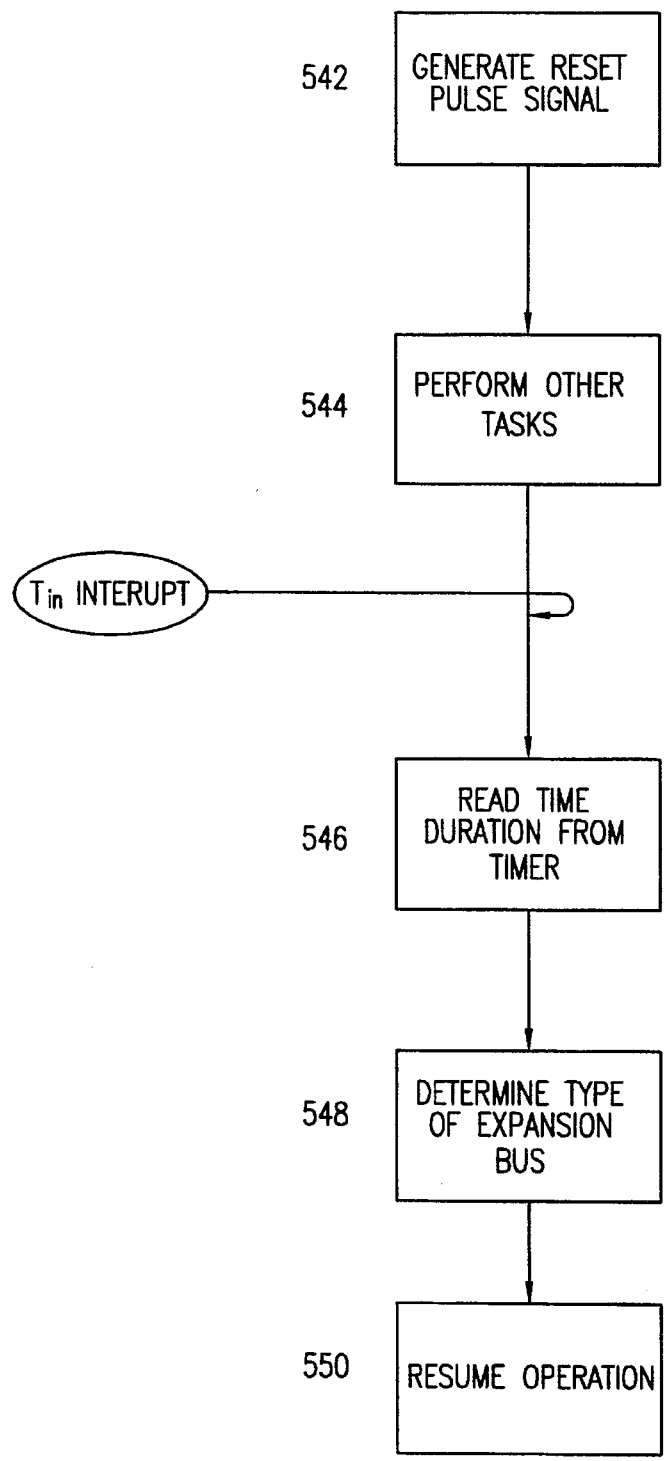

Referring now to FIGS. 4 and 5, flowchart diagrams illustrating operation of the present invention are shown. FIG. 4 illustrates operation of the identification logic in the expansion device. FIGS. 5A and 5B illustrate two methods used by the host computer to identify expansion devices. In FIG. 5 & the host computer monitors or polls for a response from the respective expansion devices. In FIG. 5B, the $T_{in}$ signal asserted by the respective expansion devices interrupts the host computer.

Referring now to FIG. 4, the operation of an expansion device when the reset signal pulse is generated is shown. FIG. 4 illustrates operation of the expansion device wherein the expansion device includes the identification logic of FIG. 3. In step 402 the expansion device receives the reset signal pulse. In step 404 the $T_{in}$ signal is negated or inactive. In step 406 the capacitor 334 charges and in step 408 the one-shot fires and the $T_{in}$ signal is asserted.

If the computer system is using a polling method to determine expansion device type, as in the method of FIG. 5A, then the status of the $T_{in}$ signal is preferably maintained by a bit in a polling register 350. In this embodiment, the $T_{in}$ signal is provided as an input to the polling register 350 in FIG. 3. Each expansion connector preferably includes a status bit in the polling register 350, and the computer system polls each bit to determine the time duration that the $T_{in}$ signal is negated when each respective polling bit indicates that the corresponding $T_{in}$ signal has been asserted. If the computer system is using an interrupt method, as in the method of FIG. 5B, then the $T_{in}$ signal is preferably provided to the INT input of the CPU 102. Each expansion connector that includes an expansion device generates an interrupt signal, and these interrupt signals are queued and acted upon as they arrive. When a respective $T_{in}$ interrupt signal is received, the computer reads the respective timer 340 to determine the time duration that the respective $T_{in}$ signal was negated.

Referring now to FIG. 5A, when the host computer boots up, the host computer generates a reset signal pulse in step 502. In response to this reset signal pulse, the expansion device performs steps 402–410 as discussed above. After the host computer generates the reset pulse signal in step 502, the host computer polls the polling register 350 in step 504 to determine if the $T_{in}$ signal is asserted. As discussed above, in this embodiment, the status of each respective $T_h$ signal is maintained by a bit in a polling register, and these bits are monitored by the host computer. If the register indicates that one of the $T_{in}$ signals is asserted in step 506, then in step 508 the computer system reads the value of the timer 340 to determine the time duration that the $T_{in}$ signal was inactive.

In step 510 the computer system determines the type of expansion device based on the time value stored in the timer 340. The CPU 102 preferably uses the time value in the timer 340 to index into a look-up table or otherwise obtain the appropriate information, which is stored in non-volatile memory. It is noted that, if a slot does not contain an expansion device, then the $T_{in}$ signal preferably goes active immediately, and the timer will hold a zero value. This indicates that the slot is empty. In step 512 the computer determines if all expansion slots have been accounted for. If not, the computer returns to step 504. It is noted that, in the embodiment of FIG. 2, the $T_{in}$ signal is asserted immediately if an expansion device is not present, and thus empty connector slots are accounted for first. In the embodiment of FIG. 3, a pull-up resistor is preferably configured on the connector to assert the $T_{in}$ signal immediately if no expansion device is present. Alternatively, the CPU 102 polls for a set period of time longer than the possible $T_{in}$ duration for any expansion device. At the end of this timeout, all slots having an expansion device will have been accounted for. It should be understood that the procedure described with reference to FIG. 5 A is performed serially with respect to the expansion card slots. One skilled in the art will well appreciate that the procedure may be performed in a parallel fashion with respect to the expansion cards if there were a requirement for faster configuration.

The embodiment of FIG. 5B uses an interrupt method for identifying expansion devices. In this embodiment, the $T_{in}$ signal generated by each expansion device interrupts the host computer. As shown, in step 542 the computer system generates a reset pulse signal. In response to this reset signal pulse, the expansion device performs steps 402–410 as discussed above. After the host computer generates the reset pulse signal in step 542, the host computer performs other tasks in step 544, such as initialization, etc. When a respective $T_{in}$ signal is asserted, an interrupt is generated to the CPU 102. The CPU 102 begins an interrupt service routine which involves reading the time duration value from the timer 340 in step 546 and determining the type of expansion device in step 548. After execution of the interrupt service routine, the host computer resumes its normal operation in step 550. This method could also be modified slightly to support the identification of hot-pluggable devices by having the identification logic store the appropriate value in a timer/register and then generate an interrupt to the CPU 102.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system having improved expansion device identification capabilities, comprising:

a CPU;

an expansion bus coupled to said CPU;

at least one expansion device coupled to said expansion bus including identification logic which generates an identification signal having a predetermined time duration, wherein said predetermined time duration identifies said expansion device; and wherein said CPU receives said identification signal having said predetermined time duration and uses said identification signal to identify said expansion device.

2. The computer system of claim 1, wherein said CPU generates a reset signal pulse over said expansion bus to said expansion device; and wherein said identification logic generates said identification signal for said predetermined time duration after generation of said reset signal pulse.

3. The computer system of claim 2, wherein said computer system further comprises a timer which times said predetermined time duration.

4. The computer system of claim 2, wherein said identification logic negates said identification signal when said reset signal pulse is generated and asserts said identification signal after said predetermined time duration.

5. The computer system of claim 1, wherein said computer system further comprises a polling register which receives said identification signal;
   wherein said polling register includes one or more bits representing status of said identification signal; and
   wherein said CPU polls said one or more bits in said polling register to determine when said expansion device identification logic generates said identification signal.

6. The computer system of claim 1, wherein, said CPU includes an interrupt input receiving said identification signal.

7. The computer system of claim 1, wherein said identification logic includes a capacitor having a predetermined capacitance corresponding to said predetermined time duration.

8. The computer system of claim 7, wherein said predetermined time duration is set with an RC time constant using said capacitor and a resistor.

9. The computer system of claim 1, wherein said identification logic comprises a capacitor;
   wherein said computer system further comprises a gate having an input which is coupled to said capacitor when said expansion device is connected to said expansion bus; and
   wherein said gate generates said identification signal when said capacitor has charged to a predetermined voltage.

10. The computer system of claim 1, wherein said identification logic comprises a one shot timer.

11. A method for identifying one or more expansion devices that are connected to an expansion bus in a computer system, comprising the steps of:
    providing power to the computer system;
    the expansion device generating an identification signal for a predetermined time, said step of generating occurring after said step of providing power to the computer system;
    the computer system determining said predetermined time that said identification signal was generated; and
    the computer system identifying the expansion device using said predetermined time determined in said step of determining.

12. The method of claim 11, further comprising:
    the computer system generating a signal to the expansion device after said step of providing power and prior to said step of generating said identification signal;
    wherein said step of generating said identification signal is performed immediately after said step of the computer system generating said signal to the identification logic.

13. The method of claim 12, wherein said step of the computer system generating said signal to the expansion device comprises generating a reset signal pulse to the expansion device.

14. The method of claim 11, wherein said step of the computer system determining said predetermined time that said identification signal was generated comprises:
    the computer system timing a duration of time that said identification signal is generated and storing a value indicative thereof and
    the computer system reading said value.

15. The method of claim 14, wherein said step of the computer system determining said predetermined time that said identification signal was generated further comprises:
    the computer system polling a register during said step of the computer system timing the duration of time to determine when said identification signal has been generated.

16. The method of claim 14, wherein said step of the computer system determining said predetermined time that said identification signal was generated further comprises:
    the computer system receiving said identification signal as an interrupt after said step of the computer system timing the duration of time;
    wherein said computer system performs said step of reading said value after said identification signal is received as an interrupt.

17. The method of claim 11, wherein said step of the expansion device generating said identification signal comprises:
    the expansion device negating said identification signal after said reset pulse signal is generated; and
    the expansion device asserting said identification signal at said predetermined time after said reset pulse signal is generated.

18. A computer system having improved expansion device identification capabilities, comprising:
    a CPU having an interrupt input;
    an expansion bus coupled to said CPU;
    at least one expansion device coupled to said expansion bus including identification logic which generates an identification signal having a predetermined time duration, wherein said predetermined time duration identifies said expansion device; and
    wherein said CPU receives said identification signal having said predetermined time duration at said interrupt input, and said CPU uses said identification signal to identify said expansion device.

19. A computer system having improved expansion device identification capabilities, comprising:
    a CPU;
    an expansion bus coupled to said CPU;
    at least one expansion device coupled to said expansion bus including identification logic which generates an identification signal having a predetermined time duration, wherein said predetermined time duration identifies said expansion device and wherein said identification logic comprises a capacitor;
    a gate having an input which is coupled to said capacitor when said expansion device is connected to said expansion bus, wherein said gate generates said identification signal when said capacitor has charged to a predetermined voltage; and
    wherein said CPU receives said identification signal having said predetermined time duration and uses said identification signal to identify said expansion device.

20. A method for identifying one or more expansion devices that are connected to an expansion bus in a computer system, comprising the steps of:
    providing power to the computer system;
    the expansion device generating an identification signal for a predetermined time, said step of generating occurring after said step of providing power to the computer system;

the computer system determining said predetermined time that said identification signal is generated, wherein the computer system determining said predetermined time comprises:

the computer system beginning timing a duration of time when said identification signal is generated;

the computer system receiving an interrupt after said predetermined time; and the computer system determining said duration of time after receiving said interrupt; and the computer system identifying the expansion device using said predetermined time determined in said step of determining.

\* \* \* \* \*